April 30, 1929. G. D. HUGO 1,710,926
BRAKE OPERATING MECHANISM
Filed Oct. 19, 1925  2 Sheets-Sheet 1
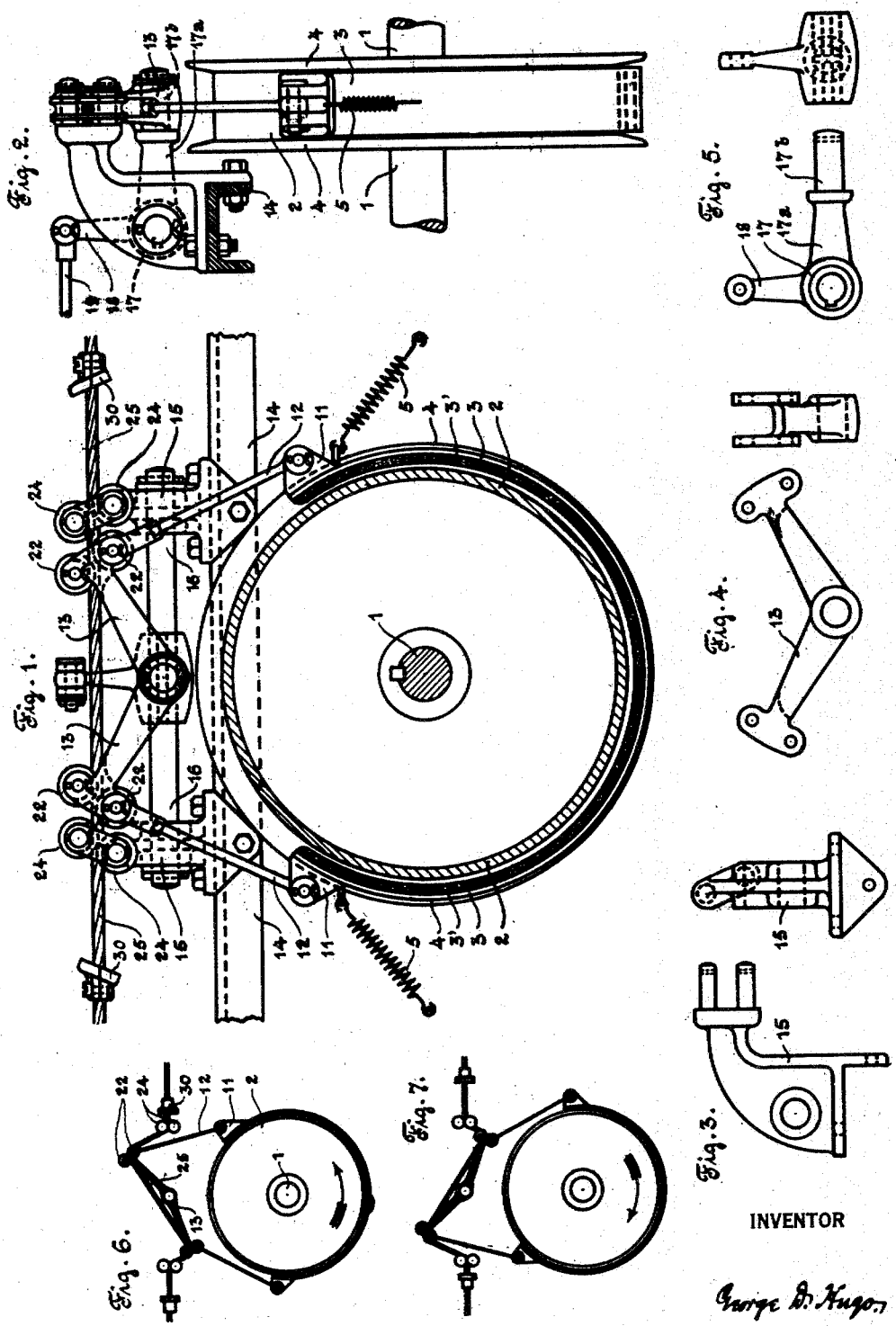
INVENTOR
George D. Hugo Patented Apr. 30, 1929.

1,710,926

UNITED STATES PATENT OFFICE.

GEORGE D. HUGO, OF SEATTLE, WASHINGTON.

BRAKE-OPERATING MECHANISM.

Application filed October 19, 1925. Serial No. 63,441.

This invention relates to brake operating mechanism, more particularly to improvements in mechanism used in connection with and for the actuation of braking members of automobiles, busses, trucks and other vehicles.

The object of this invention is to provide improvements in brake actuating mechanism, or means in connection with the propeller shaft, through which the inertia or momentum of the vehicle may be converted into a controllable force for the application of the brakes.

Another object is to provide for the automatic equalization of the forces applied to the several brake drums and for the reaction of forces from one brake to the others.

A further object is to provide mechanism of the above character that will serve as an emergency brake in case of failure of the wheel-brake or mechanism connected therewith, also as a lock, when the vehicle is not in motion.

Another object is to provide means for taking care of any necessary length of brake arm movement without increasing the leverage or distance of travel of the hand or foot control lever, thereby avoiding frequent readjustments of the brakes.

More specifically stated, the object of the invention resides in the provision of a drum on the drive shaft of a motor vehicle with a band disposed loosely about the drum and having operative connection with the wheel-brakes of the vehicle, whereby the brakes will be functionally actuated whenever the band is manually actuated into frictional contact with the revolving drum.

In accomplishing these and other objects, details of the construction have been provided, the preferred forms of which are illustrated in the accompanying drawings, wherein:

Fig. 1 is an elevation of a brake operating mechanism embodied by the present invention; one flange of the brake drum being broken away for better illustration.

Fig. 2 is a side elevation of the same.

Fig. 3 is a view showing a side and an edge elevation, respectively, of one of the supporting brackets for the brake actuating mechanism.

Fig. 4 is a view showing a side and an edge elevation, respectively, of the balance lever.

Fig. 5 is a view showing a side elevation and end view, respectively, of the bell crank lever of the brake actuating mechanism.

Figs. 6 and 7 are diagrammatic views illustrating the movement of the brake mechanism effected by the drum when operating in forward and reverse driving directions, respectively.

Figure 8:
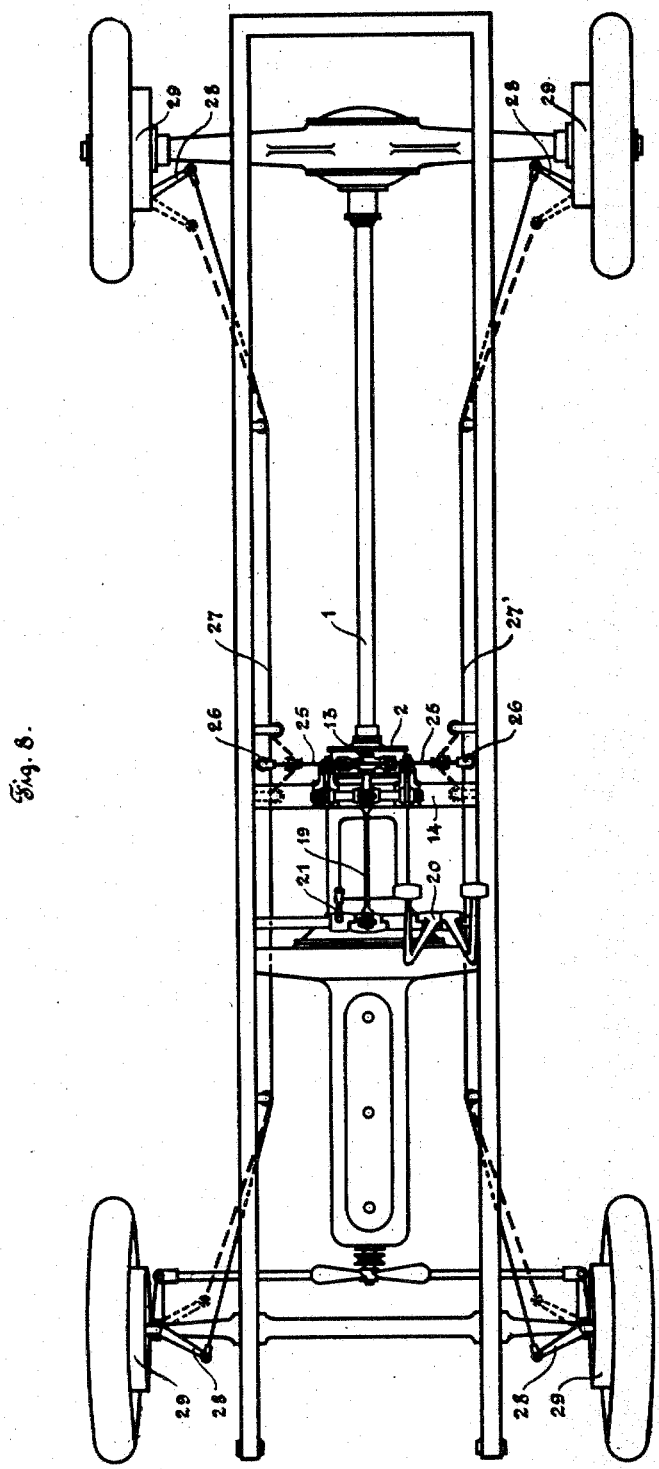

Fig. 8 a vehicle chassis of a common type of construction is shown embodying a preferred arrangement of parts where four wheel brakes are employed.

The present mechanism is intended for use primarily in motor driven vehicles such as automobiles, trucks and busses and it is to be understood that it can be arranged in the different types of vehicles in such manner as to best suit the particular design or construction.

Referring more in detail to the drawing, 1 designates what may be the driving shaft of the vehicle, which extends from the source of power, rearwardly, to an operative connection with the driving wheels. Secured to the driving shaft, so as to revolve therewith, is a drum 2 about which a yieldable friction band 3 is floatingly fitted. The drum is rotatable within the band, which is held functionally between flanges 4 at opposite edges of the drum and yieldingly retained in neutral position, as in Fig. 1 by springs 5, which are fixed to the band at opposite sides of the drum and to parts of the vehicle frame in such manner as to normally retain the band loose about the drum. The band 3 is provided with suitable lining 3' on its inner surface and its ends are disposed in spaced relation, as shown in Fig. 1 at opposite sides of the drum.

Fixed to the band at its ends are shackles 11 to which the lower ends of paired rods 12 are pivotally connected; the upper ends of the rods being pivotally connected with the opposite ends of a centrally pivoted balance lever 13 which, by means presently described, may be actuated bodily upward to thereby cause the band 3 to be tightened against the drum so that it will tend to rotate therewith.

14 designates a cross member of the vehicle frame, which is disposed adjacent to the upper forward edge of the drum. Fixed to this member at opposite sides of the drum are brackets 15 in which the opposite ends of a shaft 16 are rotatably mounted. Fixed on the shaft 16, centrally above the drum, is a bell crank 17 having a horizontally extending arm 17$^a$ provided at its end with a journal 17$^b$ on which the balance lever 13 is mounted and having a vertical arm 18 to which a rod 19 is attached. The rod extends forwardly to mechanism connecting with the pedal 20 and lever 21, which may be manually actuated to effect a pivotal movement of the bell crank whereby the balance lever is raised and the band 3 is tightened against the drum 2.

The balance lever 13 is provided at each end with a pair of guide rollers 22 which are adjacent to and normally in alinement with similar paired guide rollers 24 that are mounted on the fixed brackets 15.

Extended slidably between the guide rollers 22 and 24 is a taut cable 25 which at its ends is provided with pulleys 26 that are mounted on cables 27 and 27' that extend longitudinally of the vehicle and are connected at their ends with the actuating arms 28 of the wheel brakes, indicated at 29, of the forward and rearward wheels; the connection being such that drawing in of the cable 25 causes tension on the cables 27 and 27' and actuation of the brakes. Fastened adjustably to the cable 25, in spaced relation to and outside of the guide rollers 24, are stop blocks 30 whereby movement of the cable through the rollers in opposite directions is limited.

With parts so constructed and assembled as described, the operation would be as follows: When braking pressure is applied by the vehicle operator to the foot pedal 20, or lever 21, this, through link 19, actuates the bell crank lever 15 to lift the balance lever 13 upwardly, whereby the rods 12 draw the band 3 into frictional contact with the drum 2. This contact tends to cause the friction band to cling to the drum and rotate therewith, thereby moving it from neutral position, as shown in Fig. 1 to a position shown in Fig. 6, if the vehicle is traveling forwardly, or to a position as shown in Fig. 7, when the vehicle is moving rearwardly.

The displacement of the band, due to its frictional contact with the drum, through the rods 12 causes a pivotal movement of the balance lever 13 and thereby a radial movement of the paired rollers 22 from the horizontal alinement with the fixed guide rollers 24, which results in the drawing in of the ends of the cable 25 and a resultant drawing in on cables 27—27' to effect actuation of the wheel brake mechanisms with which they connect.

Since there is no fixed connection between the cable 25 and the balance lever 13, but the cable is free to slide through the guide rollers thereon, an automatic equalization of braking forces, as applied to the brakes at opposite sides of the vehicle is thereby provided and likewise, an equalization of braking forces between forward and rearward brakes at each side.

The safety blocks 30 are mounted adjustably on the cable 25 adjacent to the guide rollers 24 to engage therewith as a means of limiting the movement of the cable so that, in the event of the failure of the cable or the braking mechanism at one side of the vehicle, that at the other side will remain operative and unaffected.

It is to be understood that, means other than the cable 25 and cables 27—27' could be used for connecting the balance lever 13 with the wheel brakes, such as chains, ropes, linkage or the like and that any means suitable to the particular construction of the vehicle may be employed as a means of actuating the bell crank 17 whereby the brake band is drawn into frictional contact with the drum.

From the foregoing description it can be seen that, while it would require but a slight pressure on a foot pedal or a hand lever to engage the friction band with the drum, the braking force derived from the momentum of the vehicle is relatively great and may be varied in accordance with the force applied through the handlever or foot pedal, thus the inertia of the vehicle can be converted into a force of ample capacity for the operation of two or more brakes of fast and heavy vehicles, without loss of efficiency through the distribution of the braking power.

It is also apparent that this type of mechanism functions with equal effectiveness on either forward or reverse speeds. Differences in movement, or travel, of the arms 28, due to spring deflection, elongation of cables, or other causes, are automatically compensated for by the greater or lesser travel of the friction band with the drum.

It is further apparent that the friction band when drawn against the drum tends to stop it and the shaft on which it is mounted from rotating and therefore constitutes a brake in itself, which may be utilized in case of emergency and at times when the vehicle is at rest.

Having thus described my invention, what I claim as new therein, and desire to secure by Letters Patent is:

1. In combination a plurality of brakes, a pivotally mounted lever, means connecting the lever with each of the brakes to actuate the latter incident to pivotal movement of the lever from a neutral position, a rotatably driven drum, a friction band fitted loosely to the drum, means providing a direct connection between the band and the said lever whereby the lever will be moved pivotally incident to rotative movement of the band with the drum, and means for bodily shifting the lever to cause the band to be drawn into or released from frictional contact with the drum.

2. In combination, a brake, a lever pivotally mounted between its ends and connected with the brake to actuate the latter by pivotal movement in either direction from a neutral position, a rotatably driven drum, a segmental friction band fitted loosely to the drum and connected at its ends with the ends of the lever, a supporting member for the lever and means for bodily shifting the support to cause the friction band to be drawn into or released from frictional contact with the drum.

3. In combination, a brake, an actuating cable for the brake, a rotating drum, a segmental band fitted loosely about the drum, a pivotally mounted lever having its ends operatively connected with the cable, means operatively connecting the lever with said segmental band, manually controllable means operable to draw the band into frictional contact with the drum to cause it to be moved rotatably thereby as a means of imparting braking movement to said lever and cable and yieldable means for returning the parts to normal position.

4. In combination with a brake, a taut brake actuating cable, a revolvably driven drum, a segmental band fitted loosely about the drum, a centrally pivoted lever having guides at its ends within which the cable is slidably contained, links pivotally connected to the ends of said lever and to corresponding ends of the segmental band, manually controllable means for drawing the band into frictional contact with the drum to cause it to be moved rotatably thereby to impart pivotal movement to the said lever and a resultant braking tension on the cable and yieldable means for returning the parts to normal position.

5. In combination, a pair of brakes, a taut braking cable connecting said brakes, stationary guides located in spaced relation within which said cable is slidably contained, a rotatably driven drum, a segmental band fitted loosely about the drum, a centrally pivoted balance lever having guides at its ends alined with the first named guides and through which said cable is extended, links pivotally connected with the ends of the segmental band and with the ends of the balance lever, manually controllable means for drawing the band into frictional contact with the drum whereby it will be caused to move rotatably therewith and the balance lever to be moved pivotally from its normal alinement with the fixed guides so as to draw in the ends of the braking cable.

6. In combination, a brake, an actuating cable for the brake, a rotating drum, a band fitted loosely about the drum, a pivotally mounted bell crank, a balance lever centrally pivoted on one arm of the bell crank and having its ends operatively connected with the cable and with corresponding ends of the said band and manually controllable means connected with the other arm of the bell crank whereby it may be moved to cause said balance lever to draw the said band into frictional contact with the drum whereby the band will be caused to move rotatably with the drum and the balance lever to be moved pivotally to effect braking tension on the cable.

7. In a vehicle braking system, a pair of brakes, a chassis member, spaced apart pairs of guide rollers supported from said member, a revolvably driven drum, a segmental brake band loosely fitted about the drum, springs attached to the band to yieldably retain it disengaged from the drum, a revolubly mounted shaft supported from the frame member, a bell crank fixed on the shaft having one arm provided with a journal at its end, a balance lever centrally pivoted on said journal, paired guide rollers at the ends of said balance lever alined with the stationary guide rollers, a cable connected at its ends with said brakes and drawn taut between the paired rollers on said frame member and on the lever, links pivotally connected with opposite ends of the lever and with corresponding ends of the segmental band and manually operable means connected with the other arm of the bell crank whereby it may be actuated to shift the balance lever to draw the said band against the drum to cause the band to be moved rotatably therewith to thereby tilt the balance lever in such manner as to cause braking tension to be applied through the said cable.

8. In combination, a brake, a brake actuating cable, a rotating drum, a band fitted loosely about the drum, yieldable means normally holding the band disengaged from the drum, a pivotally mounted lever operatively connected with said band and with the said cable and means for drawing the said band into frictional contact with the drum so that it will be moved rotatably thereby and will impart movement to the lever and cause tension on the brake actuating cable and means for limiting movement of the cable in opposite directions.

9. In a vehicle braking system, brakes at opposite sides of the vehicle, a frame member, spaced apart pairs of guide rollers supported from said frame member, a revolvably driven drum, a segmental brake band loosely fitted about the drum, springs attached to the ends of the band to yieldably retain it disengaged from the drum, a revolubly mounted shaft supported from the frame member, a bell crank fixed on the shaft having one arm provided with a journal at its end, a balance lever centrally pivoted on said journal, paired guide rollers at the ends of said balance lever normally alined with the stationary guide rollers, a brake actuating cable having its ends connected with the brakes at opposite sides of the vehicle and drawn taut between the paired rollers on said frame member and lever, links pivotally connected with opposite ends of the lever and with corresponding ends of the segmental band and manually controllable means connected with the other arm of the bell crank whereby it may be actuated to shift the balance lever to draw the said band against the drum to cause the band to be moved rotatably therewith to thereby tilt the balance lever and cause braking tension to be applied through the said cable, and stop members fixed on the cable to engage with the fixed guide rollers to limit its slidable movement in opposite directions.

10. In a motor vehicle having paired brakes at opposite sides and a taunt brake actuating cable connected at its ends with said brakes, a drum mounted on the vehicle drive shaft to rotate therewith, a segmental band loosely fitted about the drum, a pair of guides fixed in the vehicle frame through which said cable is extended, a pivotally mounted bell crank, a balance lever centrally pivoted on one arm of said bell crank, guides at the ends of said lever disposed within and normally alined with the fixed guides and also having said cable extended therethrough, links connecting the ends of said lever with ends of said segmental band, and manually controllable means for actuating the bell crank to lift the balance lever to draw the band against the drum to cause it to move rotatably therewith in accordance with the direction of rotation of the drum to thereby cause the tilting to one side or the other of the balance lever to draw in on the cable and actuate the brakes.

Signed at Seattle, Wash., this 14 day of October 1925.

GEORGE D. HUGO.